(12) United States Patent
Mann et al.

(10) Patent No.: US 12,144,030 B2
(45) Date of Patent: Nov. 12, 2024

(54) SHARING OF PHYSICAL RANDOM CHANNEL RESOURCES AMONG DIFFERENT RADIO ACCESS TECHNOLOGIES

(71) Applicant: Telefonaktiebolaget LM Ericsson (publ), Stockholm (SE)

(72) Inventors: Karl Mann, Ottawa (CA); Carl Cao, San Jose, CA (US); Gary Boudreau, Kanata (CA); Ali Afana, Kanata (CA); Ramy Atawia, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 379 days.

(21) Appl. No.: 17/765,971

(22) PCT Filed: Oct. 2, 2020

(86) PCT No.: PCT/IB2020/059282
§ 371 (c)(1),
(2) Date: Apr. 1, 2022

(87) PCT Pub. No.: WO2021/064683
PCT Pub. Date: Apr. 8, 2021

(65) Prior Publication Data
US 2022/0377804 A1 Nov. 24, 2022

Related U.S. Application Data

(60) Provisional application No. 62/909,879, filed on Oct. 3, 2019.

(51) Int. Cl.
*H04W 74/0833* (2024.01)
*H04W 16/14* (2009.01)
*H04W 74/08* (2024.01)

(52) U.S. Cl.
CPC ....... *H04W 74/0833* (2013.01); *H04W 16/14* (2013.01); *H04W 74/0866* (2013.01)

(58) Field of Classification Search
None
See application file for complete search history.

(56) References Cited

U.S. PATENT DOCUMENTS

2016/0007377 A1  1/2016  Frenne
2018/0115940 A1  4/2018  Abedini

FOREIGN PATENT DOCUMENTS

CN  107534634 A  1/2018
CN  110199497 A  9/2019
(Continued)

OTHER PUBLICATIONS

International Search Report and Written Opinion Dated Nov. 24, 2020 issued in PCT Application No. PCT/IB2020/059282, consisting of 11 pages.
(Continued)

*Primary Examiner* — Saad Khawar
(74) *Attorney, Agent, or Firm* — Weisberg I.P. Law, P.A.

(57) ABSTRACT

A method, system and apparatus for sharing of physical random access channel (PRACH) resources between New Radio (NR) and Long Term Evolution (LTE) radio access technologies (RATs) are disclosed. According to one aspect, a network node is provided. The network node includes processing circuitry configured to: receive a physical random access channel, PRACH, signal from a wireless device; correlate the PRACH signal with one of at least two orthogonal sequences from a common set of sequences shared among a first radio access technology, RAT, and a second RAT; and determine whether the wireless device is operating according to one of the first RAT and the second RAT based at least in part on the correlation.

20 Claims, 9 Drawing Sheets

(56) References Cited

FOREIGN PATENT DOCUMENTS

WO 2016/133726 A1 8/2016
WO 2018/128426 A1 7/2018
WO 2018/210890 A1 11/2018

OTHER PUBLICATIONS

ETSI TS 138 211 V15.3.0 (Oct. 2018); 5G; NR; Physical Channels and Modulation (3GPP TS 38.211 Version 15.3.0 Release 15), consisting of 98 pages.
ETSI TS 138 214 V15.3.0 (Oct. 2018); 5G; NR; Physical Layer Procedures for Data (3GPP TS 38.214 Version 15.3.0 Release 15), consisting of 99 pages.
Dahlman, Parkvall and Skold, "5G NR: The Next Generation Wireless Access Technology", Academic Press, 2018, pp. 322-343, consisting of 22 pages.
Chinese Office Action and English Summary translation of the Chinese Office Action dated Jul. 11, 2024 issued in corresponding Chinese Application No. 202080083684.X, consisting of 8 pages.
Interdigital, Inc., 3GPP TSG RAN WG1 Meeting #94bis; R1-1811203, Title: Design aspects of NR-U uplink signals and channels; Agenda Item: 7.2.2.3.2; Document for: Discussion; Chengdu, China, Oct. 8-12, 2018, consisting of 3 pages.

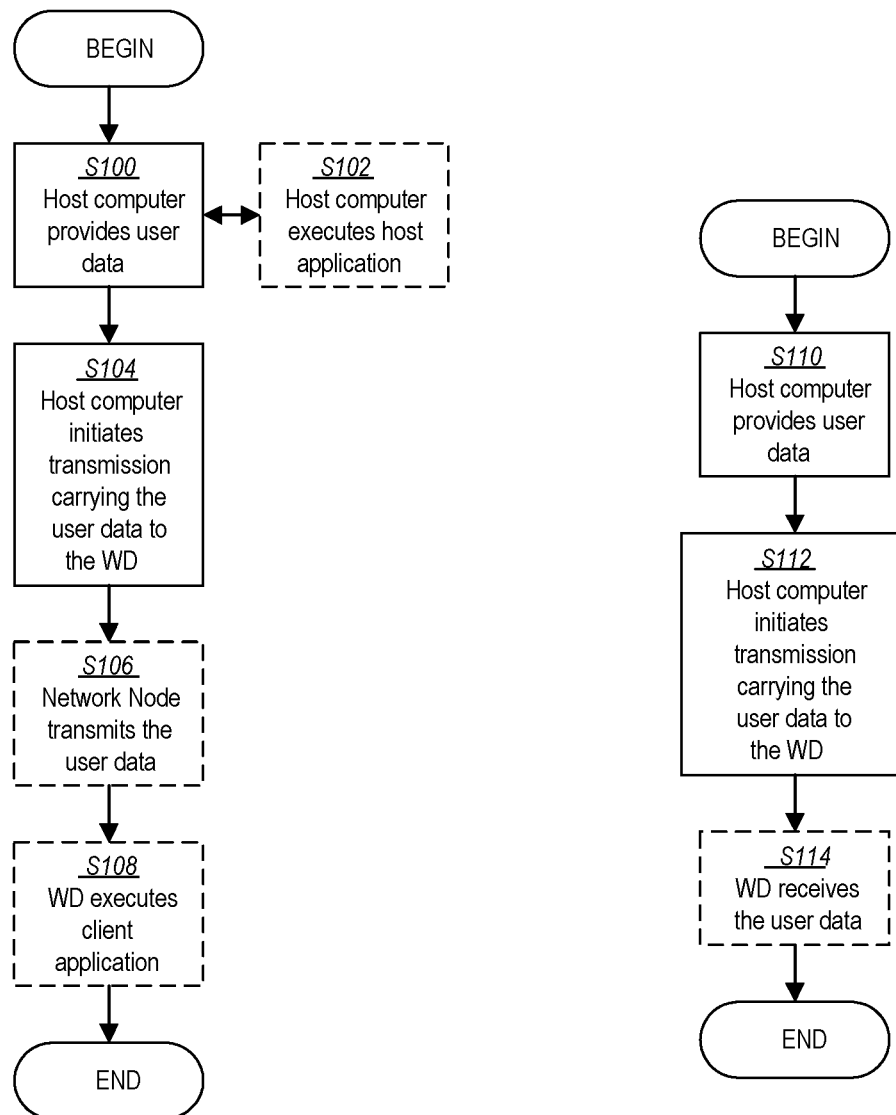

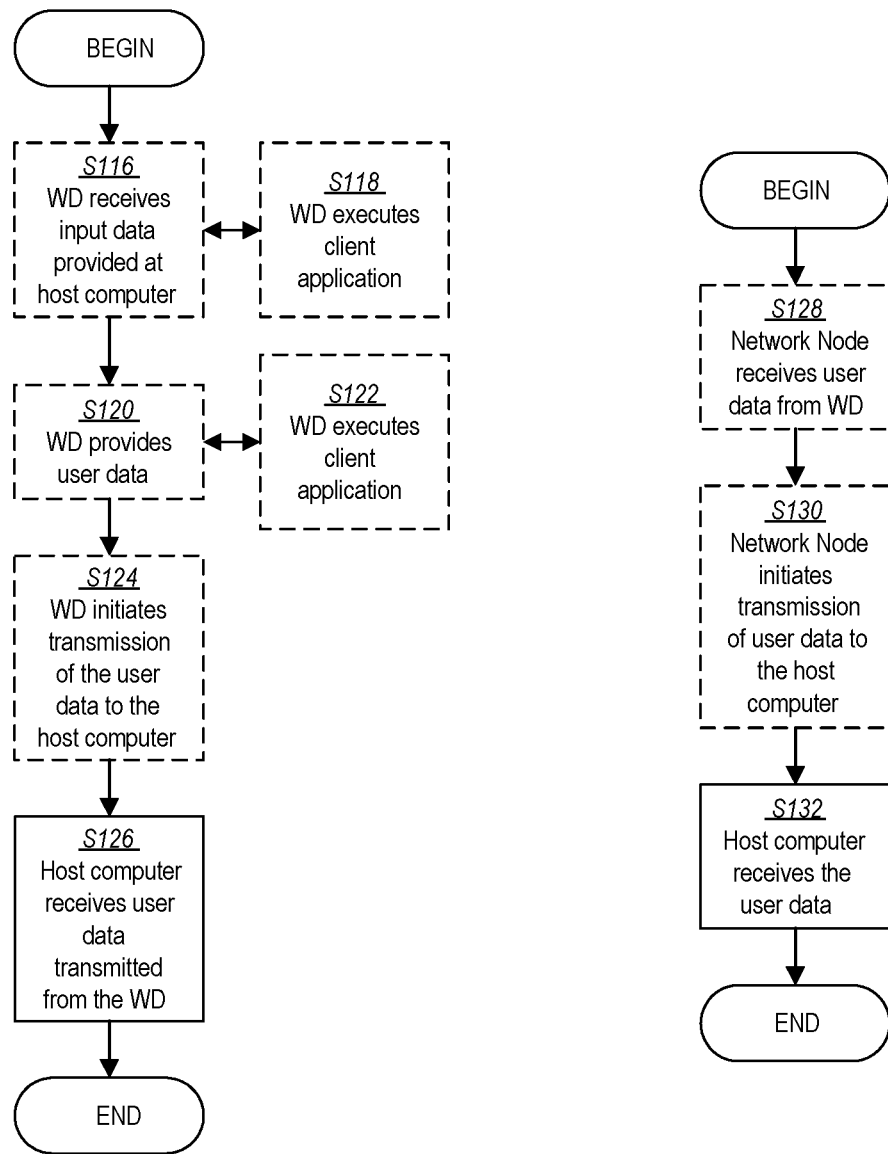

| Preamble Format | LTE | | | | | NR (Numerology 0) | | | | | |
|---|---|---|---|---|---|---|---|---|---|---|---|
| | SCS (kHz) | # of PRBs | BW (MHz) | Tcp | Tseq | Preamble Format | SCS (kHz) | # of PRBs | BW (MHz) | Tcp | Tseq |
| LTE 0 | 1.25 | 6 | 1.08 | 3168Ts | 24576Ts | NR 0 | 1.25 | 6 | 1.08 | | 24576Ts |
| LTE 1 | 1.25 | 6 | 1.08 | 21024Ts | 24576Ts | | | | | | |
| LTE 2 | 1.25 | 6 | 1.08 | 6240Ts | 2*24576Ts | | | | | | |
| LTE 3 | 1.25 | 6 | 1.08 | 21024Ts | 2*24576Ts | NR 1 | 1.25 | 6 | 1.08 | 21024Ts | 2*24576Ts |
| LTE 4 | 1.25 | 6 | 1.08 | 448Ts | 4096Ts | | | | | | |
| | | | | | | NR 2 | 1.25 | 6 | 1.08 | 4688Ts | 4*24576Ts |
| | | | | | | NR 3 | 5 | 24 | 4.32 | 3168Ts | 24576Ts |

Where Ts=0.03255 (or 1/30.72) microseconds

FIG. 13

SHARING OF PHYSICAL RANDOM CHANNEL RESOURCES AMONG DIFFERENT RADIO ACCESS TECHNOLOGIES

TECHNICAL FIELD

The present disclosure relates to wireless communications, and in particular, to sharing of physical random access channel (PRACH) resources between New Radio (NR) and Long Term Evolution (LTE) radio access technologies (RAT).

BACKGROUND

Spectrum sharing has been identified as an approach to allow operators to reuse existing LTE legacy wireless communication radio spectrum for the introduction of $3^{rd}$ Generation Partnership Project (3GPP) Fifth Generation (5G) (also called New Radio "NR") services without the initial costs of acquiring new 5G NR spectrum, or the costs of 5G radio and baseband hardware. In addition to sharing LTE and NR operation in a single band, operators have also expressed interest in sharing operation of an NR band spanning more than one LTE band.

The sharing of spectrum within a band between LTE and NR transmissions is made possible by flexible allocations of NR and LTE control channels and signals, as well as by rate matching around common or cell-specific reference signals (CRS) and synchronization signals (such as the primary synchronization signal (PSS), secondary synchronization signal (SSS), or physical broadcast channel (PBCH)) that are transmitted on an LTE carrier.

Specifically, it is possible to define certain patterns in the time and frequency domain that repeat with a certain periodicity. General patterns are block-based and defined by two bit maps, namely a frequency domain bit map with granularity of 1 resource block (RB) and a time domain bit map with granularity of 1 orthogonal frequency division multiplexed (OFDM) symbol. Employing this mechanism one can match control signals, e.g., LTE PSS/SSS.

The spectrum sharing configurations employed between NR and LTE transmissions can be implemented on a static frequency division multiplex (FDM) or time division multiplex (TDM) basis, as well as dynamic or instantaneous sharing on a TDM basis.

For implementation of random access channel (RACH) functionality, in some configurations, NR utilizes the same PRACH format as utilized in LTE, specifically PRACH long sequences (e.g., with a length L=839) with format 0, which is common with LTE long sequence format 0, and NR long sequence 1, which is common with LTE format 3. See FIG. 1. Note that formats 0, 1 and 2 are supported for a subcarrier spacing of 1.25 kHz and a bandwidth of 1.08 MHz, whereas format 3 corresponds to a subcarrier spacing of 5 kHz and a bandwidth of 4.32 MHz. In addition, NR supports short PRACH sequences of length L=139, with a number of formats defined (A, B, and C).

Different preamble sequences can be generated from different Zadoff Chu sequences corresponding to different root indices, and different preamble sequences can also be generated from different cyclic shifts of the same root sequence. Such sequences are orthogonal to each other; however, the orthogonality is maintained at the receiver only if the relative cyclic shift between two sequences is larger than any difference in their respective receive timing. Thus, in practice, only a subset of the cyclic shifts can be used to generate different preambles, where the number of available shifts depends on the maximum timing uncertainty, which in turn depends on the cell size. For small cells, a relatively large number of cyclic shifts can often be used, whereas for larger cells, a smaller number of cyclic shifts will typically be available. The set of cyclic shifts that can be used within a cell is defined by the "zero-correlation zone" parameter which is part of the cell random-access configuration provided in the SIB1 message. In practice, the zero-correlation zone parameter points to a table that indicates the set of cyclic shifts available in the cell. Note that different tables indicated by the zero-correlation-zone parameter have different distances between the cyclic shifts, thus providing larger or smaller "zones" in terms of timing error for which orthogonality (i.e., zero correlation) is maintained.

For spectrum sharing between NR and LTE, separate RACH processes are implemented for each of LTE and NR, resulting in inefficient use of available physical resource blocks (PRBs) in the uplink (UL) shared spectrum (i.e., at least an additional 6 PRBs are needed for over-the-air transmission.)

SUMMARY

Some embodiments advantageously provide methods, network nodes, and wireless devices for sharing of PRACH resources between different radio access technologies such as NR and LTE RATs.

In a spectrum sharing solution between LTE and NR, some embodiments allow a common set of PRACH sequences to be assigned to wireless devices operating according to LTE and NR in a defined manner that minimizes the number of PRBs in the UL to be reserved for RACH processing, as compared to known methods.

According to one aspect of the disclosure, a method for a network node in a communication network is provided. A physical random access channel, PRACH, signal is received from a wireless device. The PRACH signal is correlated with one of at least two orthogonal sequences from a common set of sequences shared among a first radio access technology, RAT, and a second RAT. A determination is made whether the wireless device is operating according to one of the first RAT and the second RAT based at least in part on the correlation.

According to one or more embodiments of this aspect, the common set of sequences are partitioned equally among first RAT wireless devices and second RAT wireless devices. According to one or more embodiments of this aspect, the common set of sequences are partitioned based at least on a fraction of deployments of first RAT wireless devices and second RAT wireless devices. According to one or more embodiments of this aspect, the common set of sequences are partitioned based at least on a ratio of bandwidth parts, BWPs, associated with second RAT wireless devices to a total bandwidth of shared spectrum.

According to one or more embodiments of this aspect, a first set of sequences of the common set of sequences are assigned to first RAT wireless devices and a second set of sequence of the common set of sequence are assigned to second RAT wireless devices where the first set of sequences is interleaved with the second set of sequences to maintain orthogonality between the first and second set of sequences. According to one or more embodiments of this aspect, the first set of sequences are assigned to even subcarrier indices and the second set of sequences are assigned to odd subcarrier indices. According to one or more embodiments of this aspect, a first set of sequences of the common set of sequences are assigned to a first set of first RAT beams and a second set of sequence of the common set of sequence are assigned to a second set of second RAT beams.

According to one or more embodiments of this aspect, a determination is made that a first region in a first RAT cell fails to overlap with second region in a second RAT cell. The first region in the first RAT cell and the second region in the second RAT cell are configured to reuse sequences. According to one or more embodiments of this aspect, the common set of sequences correspond to common sequences among at least one PRACH format for the first RAT and at least one PRACH format for the second RAT.

According to another aspect of the disclosure, a network node is provided. The network node includes processing circuitry configured to: receive a physical random access channel, PRACH, from a wireless device; correlate the PRACH signal with one of at least two orthogonal sequences from a common set of sequences shared among a first radio access technology, RAT, and a second RAT, and determine whether the wireless device is operating according to one of the first RAT and the second RAT based at least in part on the correlation.

According to one or more embodiments of this aspect, the common set of sequences are partitioned equally among first RAT wireless devices and second RAT wireless devices. According to one or more embodiments of this aspect, the common set of sequences are partitioned based at least on a fraction of deployments of first RAT wireless devices and second RAT wireless devices. According to one or more embodiments of this aspect, the common set of sequences are partitioned based at least on a ratio of bandwidth parts, BWPs, associated with second RAT wireless devices to a total bandwidth of shared spectrum.

According to one or more embodiments of this aspect, a first set of sequences of the common set of sequences are assigned to first RAT wireless devices and a second set of sequence of the common set of sequence are assigned to second RAT wireless devices where the first set of sequences are interleaved with the second set of sequences to maintain orthogonality between the first and second set of sequences. According to one or more embodiments of this aspect, the first set of sequences are assigned to even subcarrier indices and the second set of sequences are assigned to odd subcarrier indices. According to one or more embodiments of this aspect, a first set of sequences of the common set of sequences are assigned to a first set of first RAT beams and a second set of sequence of the common set of sequence are assigned to a second set of second RAT beams.

According to one or more embodiments of this aspect, the processing circuitry is further configured to: determine a first region in a first RAT cell fails to overlap with second region in a second RAT cell, and configure the first region in the first RAT cell and the second region in the second RAT cell to reuse sequences. According to one or more embodiments of this aspect, the common set of sequences correspond to common sequences among at least one PRACH format for the first RAT and at least one PRACH format for the second RAT.

According to another aspect of the disclosure, a wireless device configured to communicate with a network node is provided. The wireless device includes processing circuitry configured to: apply at least one of at least two orthogonal sequences to a physical random access channel, PRACH, signal based on whether the wireless device is operating according a first radio access technology, RAT, or a second RAT to produce an encoded PRACH signal where the applying of the at least one orthogonal sequence enables sharing of PRACH resources between the first and second RATs. The processing circuitry is further configured to transmit the encoded PRACH signal to the network node.

According to another aspect of the disclosure, a method implemented by a wireless device that is configured to communicate with a network node is provided. At least one of at least two orthogonal sequences is applied to a physical random access channel, PRACH, signal based on whether the wireless device is operating according a first radio access technology, RAT, or a second RAT to produce an encoded PRACH signal where the applying of the at least one orthogonal sequence enables sharing of PRACH resources between the first and second RATs. The encoded PRACH signal is transmitted to the network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating example methods implemented in a communication system including a host computer, a network node and a wireless device for executing a client application at a wireless device according to some embodiments of the present disclosure;

FIG. 5 is a flowchart illustrating example methods implemented in a communication system including a host computer, a network node and a wireless device for receiving user data at a wireless device according to some embodiments of the present disclosure;

FIG. 6 is a flowchart illustrating example methods implemented in a communication system including a host computer, a network node and a wireless device for receiving user data from the wireless device at a host computer according to some embodiments of the present disclosure;

FIG. 7 is a flowchart illustrating example methods implemented in a communication system including a host computer, a network node and a wireless device for receiving user data at a host computer according to some embodiments of the present disclosure;

FIG. 13 shows the correspondence between LTE formats and NR formats.

DETAILED DESCRIPTION

Figure 1:
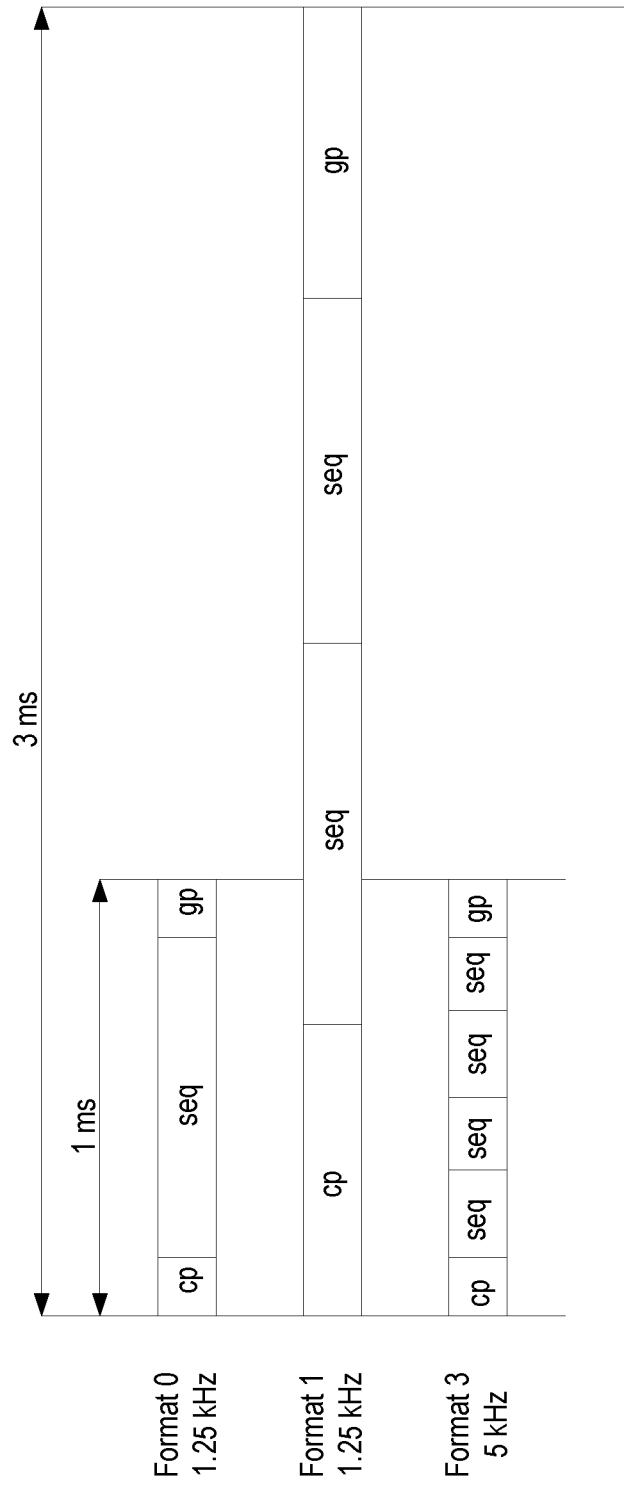
FIG. 1 illustrates PRACH formats 0, 1 and 3.

Before describing in detail exemplary embodiments, it is noted that the embodiments reside primarily in combinations of apparatus components and processing steps related to sharing of PRACH resources between NR and LTE RATs. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide sharing of PRACH resources between NR and LTE RATs. In an LTE/NR spectrum sharing solution, some embodiments allow a common set of PRACH sequences to be assigned to LTE and NR WDs in a defined manner that reduces the number of PRBs to be reserved for RACH processing as compared to known methods. A single RACH process can then be employed for detection of either the LTE or NR WDs in the shared spectrum.

Figure 2:
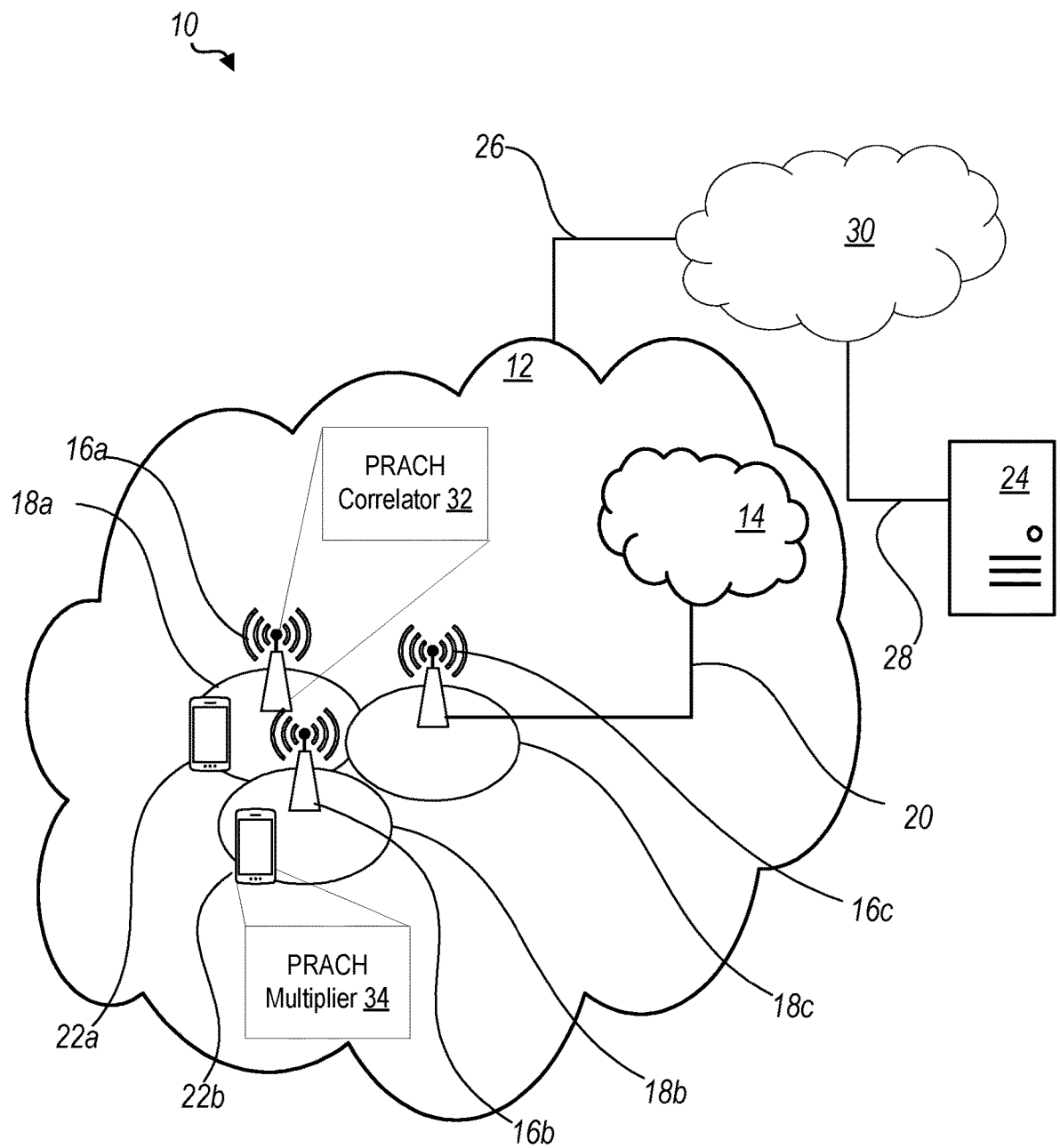
FIG. 2 is a schematic diagram of an example network architecture illustrating a communication system connected via an intermediate network to a host computer according to the principles in the present disclosure.

Returning now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a PRACH correlator 32 which is configured to correlate the PRACH signal with one of at least two orthogonal sequences to determine whether the WD is operating according to a first RAT or a second RAT. A wireless device 22 is configured to include a PRACH multiplier 34 which is configured to apply at least one of at least two orthogonal sequences to a PRACH signal based on whether the WD is operating according a first RAT or a second RAT.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a PRACH correlator 32 which is configured to correlate the PRACH signal with one of at least two orthogonal sequences to determine whether the WD is operating according to a first RAT or a second RAT.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a PRACH multiplier 34 which is configured to apply at least one of at least two orthogonal sequences to a PRACH signal based on whether the WD is operating according a first RAT or a second RAT.

In some embodiments, the inner workings of the network node 16, WD 22, and host computer 24 may be as shown in FIG. 2 and independently, the surrounding network topology may be that of FIG. 2.

Figure 3:
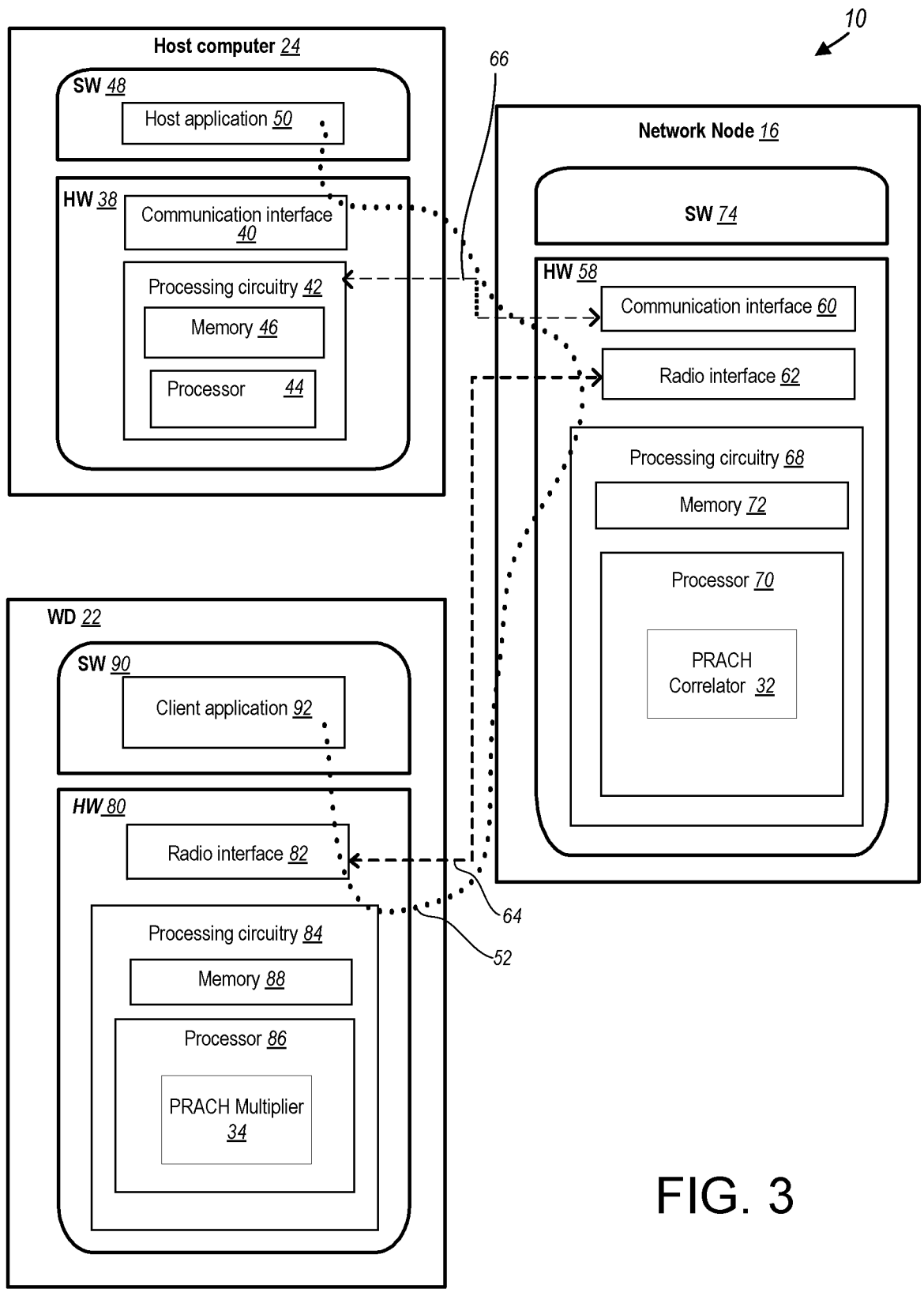
FIG. 3 is a block diagram of a host computer communicating via a network node with a wireless device over an at least partially wireless connection according to some embodiments of the present disclosure.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as PRACH correlator 32, and PRACH multiplier 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
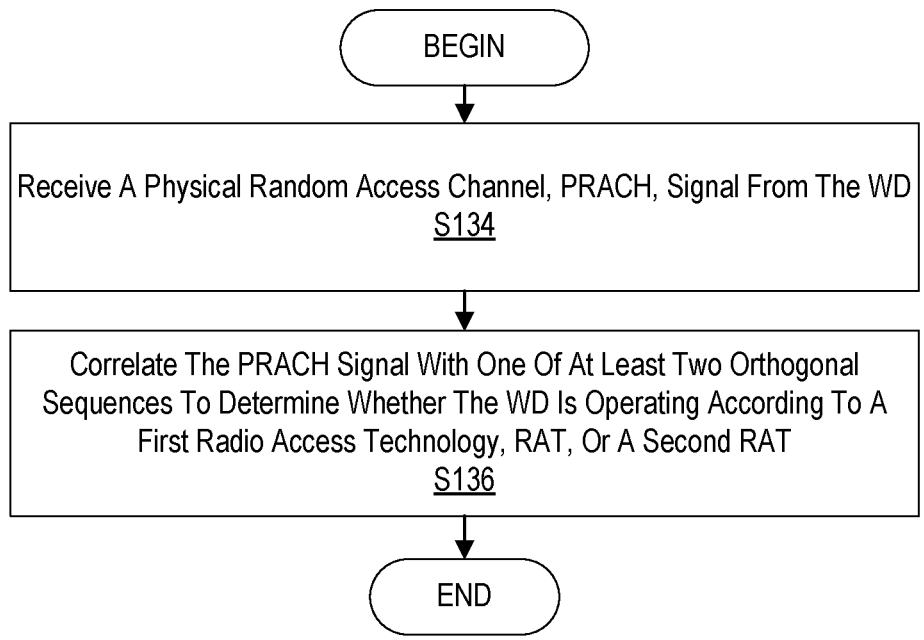
FIG. 8 is a flowchart of an example process in a network node for according to some embodiments of the present disclosure.

FIG. 8 is a flowchart of an example process in a network node 16 for determining what RAT is being used by a WD 22. One or more blocks described herein may be performed by one or more elements of network node 16 such as by one or more of processing circuitry 68 (including the PRACH correlator 32), processor 70, radio interface 62 and/or communication interface 60. Network node 16 such as via processing circuitry 68 and/or processor 70 and/or radio interface 62 and/or communication interface 60 is configured to receive a PRACH signal from the WD 22 (Block S134), and correlate the PRACH signal with one of at least two orthogonal sequences to determine whether the WD 22 is operating according to a first RAT or a second RAT (Block S136).

Figure 9:
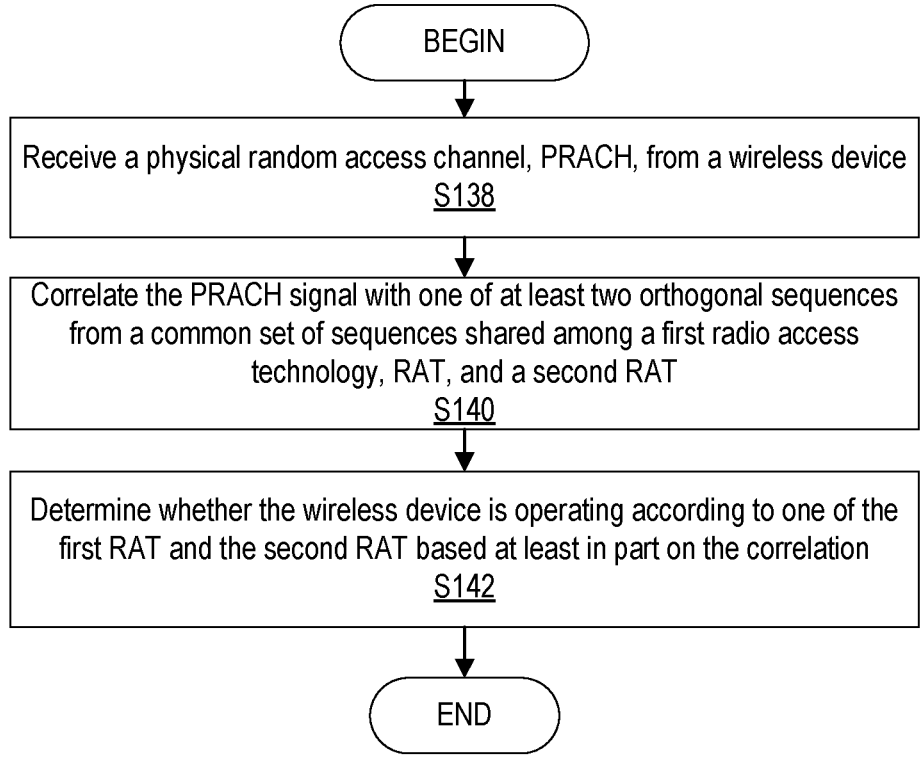
FIG. 9 is a flowchart of another example process in a network node for according to some embodiments of the present disclosure.

FIG. 9 is a flowchart of another example process in a network node 16 for determining what RAT is being used by a WD 22. One or more blocks described herein may be performed by one or more elements of network node 16 such as by one or more of processing circuitry 68 (including the PRACH correlator 32), processor 70, radio interface 62 and/or communication interface 60. Network node 16 such as via processing circuitry 68 and/or processor 70 and/or radio interface 62 and/or communication interface 60 is configured to receive (Block S138) a physical random access channel, PRACH, from a wireless device 22, as described herein. Network node 16 such as via processing circuitry 68 and/or processor 70 and/or radio interface 62 and/or communication interface 60 is configured to correlate (Block S140) the PRACH signal with one of at least two orthogonal sequences from a common set of sequences shared among a first radio access technology, RAT, and a second RAT, as described herein. Network node 16 such as via processing circuitry 68 and/or processor 70 and/or radio interface 62 and/or communication interface 60 is configured to determine (Block S142) whether the wireless device 22 is operating according to one of the first RAT and the second RAT based at least in part on the correlation, as described herein.

According to one or more embodiments, the common set of sequences are partitioned equally among first RAT wireless devices 22 and second RAT wireless devices 22. According to one or more embodiments, the common set of sequences are partitioned based at least on a fraction of deployments of first RAT wireless devices 22 and second RAT wireless devices 22. According to one or more embodiments, the common set of sequences are partitioned based at least on a ratio of bandwidth parts, BWPs, associated with second RAT wireless devices 22 to a total bandwidth of shared spectrum.

According to one or more embodiments, a first set of sequences of the common set of sequences are assigned to first RAT wireless devices 22 and a second set of sequence of the common set of sequence are assigned to second RAT wireless devices 22 where the first set of sequences being interleaved with the second set of sequences to maintain orthogonality between the first and second set of sequences. According to one or more embodiments, the first set of sequences are assigned to even subcarrier indices and the second set of sequences are assigned to odd subcarrier indices. According to one or more embodiments, a first set of sequences of the common set of sequences are assigned to a first set of first RAT beams and a second set of sequence of the common set of sequence are assigned to a second set of second RAT beams.

According to one or more embodiments, the processing circuitry 68 is further configured to: determine a first region in a first RAT cell fails to overlap with second region in a second RAT cell; and configure the first region in the first RAT cell and the second region in the second RAT cell to reuse sequences. According to one or more embodiments, the common set of sequences correspond to common sequences among at least one PRACH format for the first RAT and at least one PRACH format for the second RAT.

Figure 10:
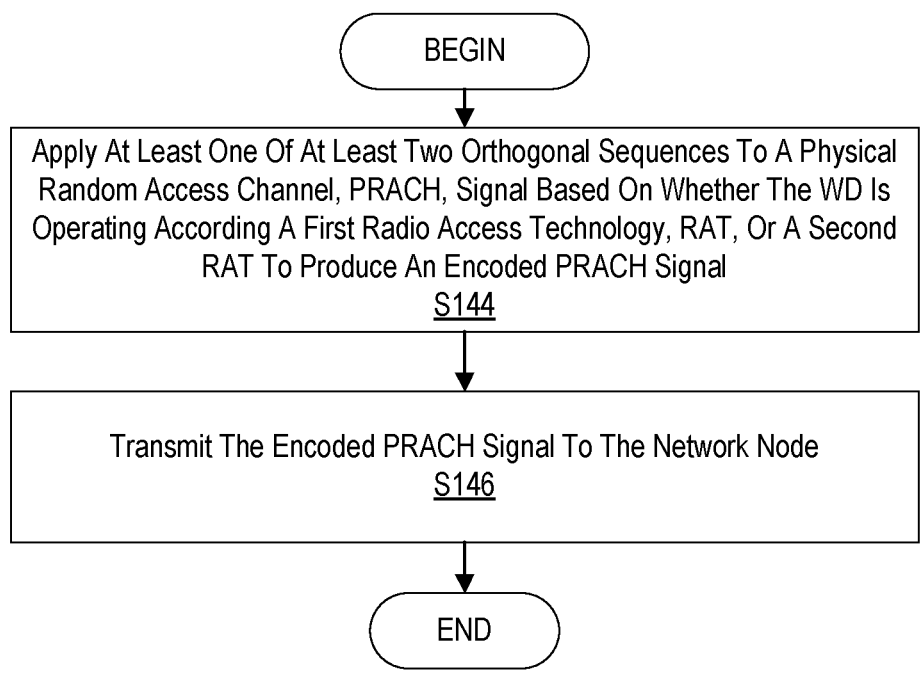
FIG. 10 is a flowchart of an example process in a wireless device according to some embodiments of the present disclosure.

FIG. 10 is a flowchart of an example process in a wireless device 22 according to some embodiments of the present disclosure. One or more blocks described herein may be performed by one or more elements of wireless device 22 such as by one or more of processing circuitry 84 (including the PRACH multiplier 34), processor 86, radio interface 82 and/or communication interface 60. Wireless device 22 such as via processing circuitry 84 and/or processor 86 and/or radio interface 82 is configured to apply at least one of at least two orthogonal sequences to a PRACH signal based on whether the WD 22 is operating according a first RAT or a second RAT to produce an encoded PRACH signal (Block S144). The process also includes transmitting the encoded PRACH signal to the network node 16 (Block S146).

Figure 11:
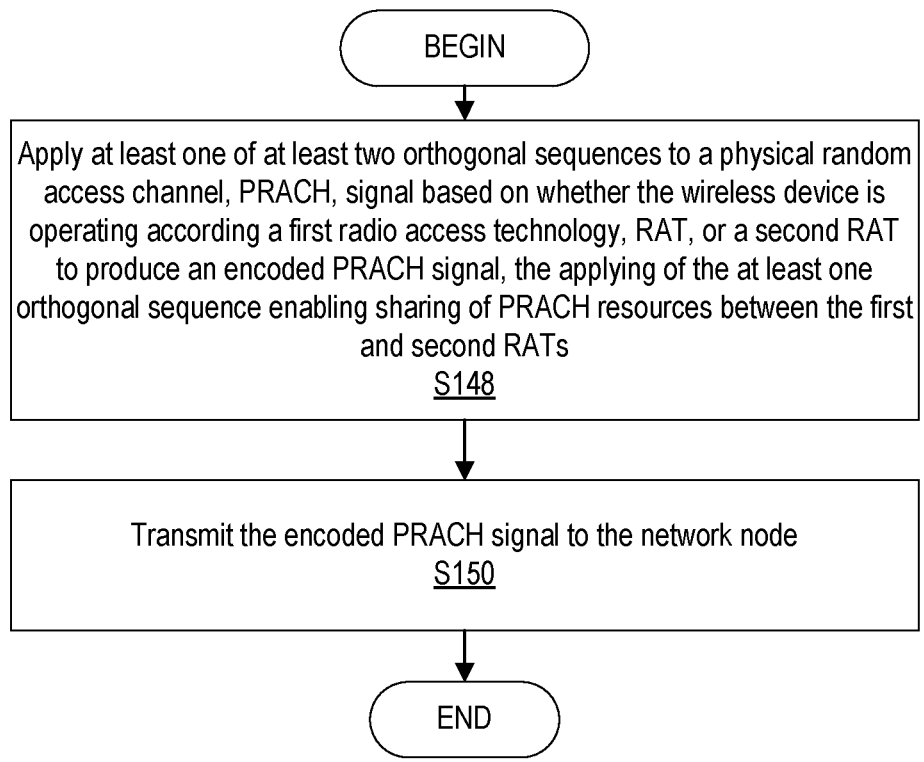
FIG. 11 is a flowchart of another example process in a wireless device according to some embodiments of the present disclosure.

FIG. 11 is a flowchart of another example process in a wireless device 22 according to some embodiments of the present disclosure. One or more blocks described herein may be performed by one or more elements of wireless device 22 such as by one or more of processing circuitry 84 (including the PRACH multiplier 34), processor 86, radio interface 82 and/or communication interface 60. Wireless device 22 such as via processing circuitry 84 and/or processor 86 and/or radio interface 82 is configured to apply (Block S148) at least one of at least two orthogonal sequences to a physical random access channel, PRACH, signal based on whether the wireless device 22 is operating according a first radio access technology, RAT, or a second RAT to produce an encoded PRACH signal where the applying of the at least one orthogonal sequence enables sharing of PRACH resources between the first and second RATs, as described herein. Wireless device 22 such as via processing circuitry 84 and/or processor 86 and/or radio interface 82 is configured to transmit (Block S150) the encoded PRACH signal to the network node 16, as described herein.

Figure 12:
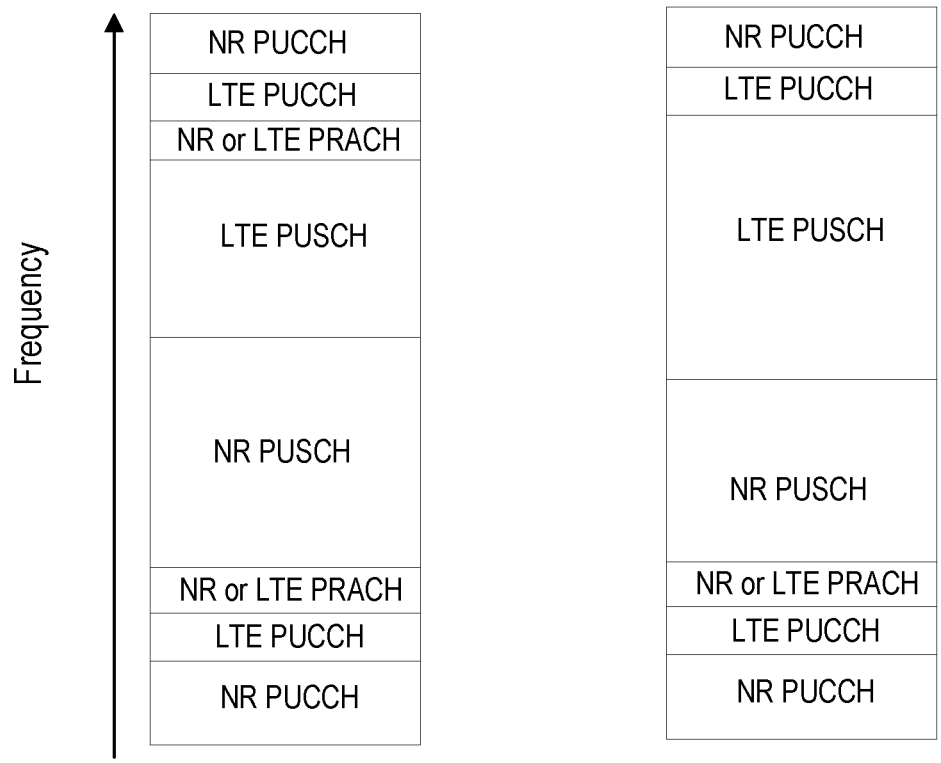
FIG. 12 illustrates frequency allocation of data and control channels in Fourth and Fifth Generation (4G, 5G) radios.

Having described the general process flow of arrangements of the disclosure and having provided examples of hardware and software arrangements for implementing the processes and functions of the disclosure, the sections below provide details and examples of arrangements for sharing of PRACH resources between NR and LTE RATs. Note FIG. 12, which shows example frequency assignments for control and data channels for Fourth Generation (4G, LTE) and Fifth Generation (5G, NR) RATs.

Embodiment 1

In one embodiment, an FDD non-standalone (NSA) spectrum sharing solution between NR and LTE RACH functionality on a single carrier of total bandwidth (BW) is provided. In some embodiments, the Zadoff-Chu root sequences of the PRACH for the NR and LTE PRACH preambles are chosen, such as via processing circuitry 68, to be orthogonal and assigned to an NR or LTE WD 22 in a defined manner. Based on the received RACH Zadoff-Chu (ZC) sequence at the network node 16 (eNB or gNB), an implicit determination can be made, for example, by the network node 16 (such as for example via processing circuitry 68) as to whether the PRACH transmission is for an NR WD 22 or an LTE WD 22. PRACH long sequences (i.e., with a length L=839) with formats 0 and 1, as shown in FIG. 1, are common between the LTE and NR physical layers. Hence, these long PRACH sequences can be partitioned between the LTE and NR WDs 22. The partitioning can be implemented using one of the following rules:
1. Equally between NR and LTE;
2. Between NR and LTE based on the fraction of WDs 22 for each of the NR and LTE deployments; or
3. For NR WDs 22 assigned a bandwidth part (BWP) in the shared spectrum, the PRACH sequences can be partitioned between LTE and NR WDs 22 based on the relative ratio of the NR BWP to the total bandwidth of the shared spectrum.

Due to the commonality of PRACH long sequences between LTE and NR, the existing PRACH configuration message in the system information block (SIB) can be employed to signal the PRACH configuration, i.e., through use of the root Sequence Index and prach-ConfigInfo fields of the system information block (SIB) message.

In order to maintain orthogonality between assigned PRACH sequences within both LTE and NR cells, chosen sequences can be interleaved between LTE and NR (e.g., assigning PRACH sequences with an odd index to LTE and an even index to NR). This can maximize the number of sequences for both LTE and NR that meet the zero-correlation zone parameter for a given cell size.

Note that this may entail partitioning based on ZC root sequences, so that a subset of ZC roots belong to NR and another subset of ZC roots belong to LTE. The PRACH processors may respectively perform matched filtering on each subset, and the peak detection step may preferably be orthogonal between the subsets.

As an additional instantiation of this embodiment the same set of ZC roots can be maintained with some cyclic shifts to assigned to NR and some assigned to LTE. This means that the matched filters can be the same and there can be a joint PRACH processor that sifts through the cyclic shifted versions to determine whether the WD 22 is on LTE or NR.

FIG. 13 shows the correspondence between LTE formats and NR formats. Note that even if the formats are different, it is still permissible to allow the same PRBs to be shared while NR does its own processing and LTE does its own. They may respectively only detect their own WD preambles. Furthermore, even if the formats are different, it is still permissible to allow the same PRBs to be shared between NR and LTE while NR and LTE each respectively implement their own processing. Here again, a WD 22 may respectively only detect its own WD preambles.

Embodiment 2

Some embodiments provide an extension of Embodiment 1 for use of PRACH when NR beamforming is present. Similar to Embodiment 1, in order to maintain orthogonality between assigned PRACH sequences within both LTE and NR cells, chosen sequences can be interleaved between LTE and NR. For this embodiment, the interleaving can be across all beams in LTE and then across the beams in NR. In other words, if there are $N_{LTE}$ beams in the LTE cell and $N_{NR}$ beams in the NR cell, the first $N_{LTE}$ sequences can be assigned to an LTE cell and next $N_{NR}$ sequences can be assigned to NR repeating the alternating assignment of $N_{LTE}$ and $N_{NR}$ subsequent sequences to LTE and then NR respectively, until all sequences are assigned. Within each set of $N_{LTE}$ or $N_{NR}$ sequences assigned to LTE or NR respectively, the first sequence can be assigned to the first beam, the second sequence can be assigned to the second beam, etc.

As a second approach of assigning the PRACH sequences in this embodiment, the sequences can be assigned by alternating assignment between LTE and NR cells. For example, the first sequence can be assigned to the first beam of the LTE cell, the $2^{nd}$ sequence assigned to the $1^{st}$ beam of the NR cell, the third sequence assigned to the $2^{nd}$ beam of the LTE cell, the fourth sequence assigned to the $2^{nd}$ beam of the NR cell, etc. In general, for odd sequence numbers, the $j^{th}$ sequence may be assigned to beam (floor(j/2)+1) modulo ($N_{LTE}$) of LTE, and for even sequence numbers the $j^{th}$ sequence may be assigned to beam (floor(j/2))modulo ($N_{NR}$) of NR, in which floor(k) is a function that gives the largest integer less than or equal to k.

Embodiment 3

Embodiment 3 provides an extension of Embodiment 1 for use of PRACH in a spectrum sharing scenario employing a mixed NR standalone (SA) plus LTE scenario. For this embodiment, the same method as defined in Embodiment 1 can be employed for scenarios in which there is a one-to-one correspondence between the LTE and NR cells employing spectrum sharing. In scenarios for which the NR and LTE have regions that are not overlapping, no sharing of PRACH sequences may be employed in some embodiments.

Embodiment 4

In this embodiment, an extension of Embodiment 1 is provided for use of PRACH in a non-standalone (NSA) TDD spectrum sharing scenario. The methods of Embodiments 1, 2 and 3 can also apply to TDD implementations of LTE and NR.

In general, a spectrum sharing process for sharing spectrum between LTE and NR allows a common set of PRACH sequences to be assigned to LTE and NR WDs 22 in a defined manner that minimizes the number of PRBs to be reserved for RACH processing.

Thus, according to one aspect, a network node 16 configured to communicate with a wireless device 22 (WD 22), the network node 16 comprising a radio interface 62 and/or comprising processing circuitry 68 configured to receive a physical random access channel, PRACH, signal from the WD 22. The processing circuitry 68 is further configured to correlate the PRACH signal with one of at least two orthogonal sequences to determine whether the WD 22 is operating according to a first radio access technology, RAT, or a second RAT.

According to this aspect, in some embodiments, the PRACH signal is partitioned by the processing circuitry 84 into sequences that are interleaved so that adjacent sequences or groups of sequences alternate between being assigned to the first RAT and being assigned to the second RAT. In some embodiments, the alternating sequences are assignable via the processing circuitry 68 to different beams when beamforming is present. In some embodiments, the network node 16 operates in a mixed New Radio, NR, standalone, SA, plus Long Term Evolution, LTE, mode when there is a one-to-one correspondence between LTE ad NR cells employing spectrum sharing. In some embodiments, the network node 16 operates in a non-standalone (NSA) time division duplex, TDD, spectrum sharing mode. In some embodiments, the at least two orthogonal sequences have a property that a cyclically shifted version of such a sequence is uncorrelated with the sequence.

According to yet another aspect, a method includes receiving a PRACH signal from the WD 22. The method also includes correlating, via the PRACH correlator 32 the PRACH signal with one of at least two orthogonal sequences to determine whether the WD 22 is operating according to a first RAT or a second RAT.

According to this aspect, in some embodiments, the PRACH signal is partitioned into sequences that are interleaved so that adjacent sequences or groups of sequences alternate between being assigned to the first RAT and being assigned to the second RAT. In some embodiments, the alternating sequences are assignable to different beams when beamforming is present. In some embodiments, the network node 16 operates in a mixed New Radio, NR, standalone, SA, plus Long Term Evolution, LTE, mode when there is a one-to-one correspondence between LTE ad NR cells employing spectrum sharing. In some embodiments, the network node 16 operates in a non-standalone (NSA) time division duplex, TDD, spectrum sharing mode. In some embodiments, the at least two orthogonal sequences have a property that a cyclically shifted version of such a sequence is uncorrelated with the sequence.

According to yet another aspect, a WD 22 configured to communicate with a network node 16 is provided. The WD 22 comprises a radio interface 82 and/or processing circuitry 84 configured to apply at least one of at least two orthogonal sequences to a PRACH, signal based on whether the WD 22 is operating according a first RAT or a second RAT to produce an encoded PRACH signal, the applying of the at least one orthogonal sequence enabling sharing of PRACH resources between the first and second RATs. The radio interface 82 is further configured to transmit the encoded PRACH signal to the network node 16.

According to this aspect, in some embodiments, the PRACH signal is partitioned, via the processing circuitry 84, into sequences that are interleaved so that adjacent sequences alternate between being assigned to the first RAT and being assigned to the second RAT. In some embodiments, the partitioning is into sequences divided equally among the first RAT and the second RAT. In some embodiments, the partitioning is into sequences divided among the first RAT and the second RAT in proportion to a fraction of WDs 22 operating according to each of the first and second RATs. In some embodiments, the partitioning is into sequences divided among the first RAT and the second RAT based on a ratio of a bandwidth part, BWP, of the first RAT to a total bandwidth of shared spectrum.

According to another aspect, a method implemented in a WD 22 includes applying, via the processing circuitry 84, at least one of at least two orthogonal sequences to a PRACH signal based on whether the WD 22 is operating according a first RAT or a second RAT to produce an encoded PRACH signal, the applying of the least one orthogonal sequence enabling sharing of PRACH resources between the first and second RATs. The method also includes transmitting, via the radio interface 82, the encoded PRACH signal to the network node 16.

According to this aspect, in some embodiments, the PRACH signal is partitioned, via the processing circuitry 84, into sequences that are interleaved so that adjacent sequences alternate between being assigned to the first RAT and being assigned to the second RAT. In some embodiments, the partitioning is into sequences divided equally among the first RAT and the second RAT. In some embodiments, the partitioning is into sequences divided among the first RAT and the second RAT in proportion to a fraction of WDs 22 operating according to each of the first and second RATs. In some embodiments, the partitioning is into sequences divided among the first RAT and the second RAT based on a ratio of a bandwidth part, BWP, of the first RAT to a total bandwidth of shared spectrum.

Some Examples

Example A1. A network node 16 configured to communicate with a wireless device 22 (WD 22), the network node 16 configured to, and/or comprising a radio interface 62 and/or comprising processing circuitry 68 configured to:
  receive a physical random access channel, PRACH, signal from the WD 22; and
  correlate the PRACH signal with one of at least two orthogonal sequences to determine whether the WD 22 is operating according to a first radio access technology, RAT, or a second RAT.

Example A2. The network node 16 of Example A1, wherein the PRACH signal is partitioned into sequences that are interleaved so that adjacent sequences or groups of sequences alternate between being assigned to the first RAT and being assigned to the second RAT.

Example A3. The network node 16 of Example A2, wherein the alternating sequences are assignable to different beams when beamforming is present.

Example A4. The network node 16 of any of Examples A1-A3, wherein the network node 16 operates in a mixed New Radio, NR, standalone, SA, plus Long Term Evolution, LTE, mode when there is a one-to-one correspondence between LTE ad NR cells employing spectrum sharing.

Example A5. The network node 16 of any of Examples A1-A3, wherein the network node 16 operates in a non-standalone (NSA) time division duplex, TDD, spectrum sharing mode.

Example A6. The network node 16 of any of Examples A1-A3, wherein the at least two orthogonal sequences have a property that a cyclically shifted version of such a sequence is uncorrelated with the sequence.

Example B1. A method implemented in a network node 16, the method comprising:
  receiving a physical random access channel, PRACH, signal from the WD 22; and
  correlating the PRACH signal with one of at least two orthogonal sequences to determine whether the WD 22 is operating according to a first radio access technology, RAT, or a second RAT.

Example B2. The method of Example B1, wherein the PRACH signal is partitioned into sequences that are interleaved so that adjacent sequences or groups of sequences alternate between being assigned to the first RAT and being assigned to the second RAT.

Example B3. The method of Example B2, wherein the alternating sequences are assignable to different beams when beamforming is present.

Example B4. The method of any of Examples B1-B3, wherein the network node 16 operates in a mixed New Radio, NR, standalone, SA, plus Long Term Evolution, LTE, mode when there is a one-to-one correspondence between LTE ad NR cells employing spectrum sharing.

Example B5. The method of any of Examples B1-B3, wherein the network node 16 operates in a non-standalone (NSA) time division duplex, TDD, spectrum sharing mode.

Example B6. The method of any of Examples B1-B3, wherein the at least two orthogonal sequences have a property that a cyclically shifted version of such a sequence is uncorrelated with the sequence.

Example C1. A wireless device 22 (WD 22) configured to communicate with a network node 16, the WD 22 configured to, and/or comprising a radio interface 82 and/or processing circuitry 84 configured to:
  apply at least one of at least two orthogonal sequences to a physical random access channel, PRACH, signal based on whether the WD 22 is operating according a first radio access technology, RAT, or a second RAT to produce an encoded PRACH signal, the applying of the at least one orthogonal sequence enabling sharing of PRACH resources between the first and second RATs; and
  transmit the encoded PRACH signal to the network node 16.

Example C2. The WD 22 of Example C1, wherein the PRACH signal is partitioned into sequences that are interleaved so that adjacent sequences alternate between being assigned to the first RAT and being assigned to the second RAT.

Example C3. The WD 22 of Example C2, wherein the partitioning is into sequences divided equally among the first RAT and the second RAT.

Example C4. The WD 22 of Example C2, wherein the partitioning is into sequences divided among the first RAT and the second RAT in proportion to a fraction of WDs 22 operating according to each of the first and second RATs.

Example C5. The WD 22 of Example C2, wherein the partitioning is into sequences divided among the first RAT and the second RAT based on a ratio of a bandwidth part, BWP, of the first RAT to a total bandwidth of shared spectrum.

Example D1. A method implemented in a wireless device 22 (WD 22), the method comprising:
  applying at least one of at least two orthogonal sequences to a physical random access channel, PRACH, signal based on whether the WD 22 is operating according a first radio access technology, RAT, or a second RAT to produce an encoded PRACH signal, the applying of the least one orthogonal sequence enabling sharing of PRACH resources between the first and second RATs; and
  transmitting the encoded PRACH signal to the network node 16.

Example D2. The method of Example D1, wherein the PRACH signal is partitioned into sequences that are interleaved so that adjacent sequences alternate between being assigned to the first RAT and being assigned to the second RAT.

Example D3. The method of Example D2, wherein the partitioning is into sequences divided equally among the first RAT and the second RAT.

Example D4. The method of Example D2, wherein the partitioning is into sequences divided among the first RAT and the second RAT in proportion to a fraction of WDs 22 operating according to each of the first and second RATs.

Example D5. The method of Example D2, wherein the partitioning is into sequences divided among the first RAT and the second RAT based on a ratio of a bandwidth part, BWP, of the first RAT to a total bandwidth of shared spectrum.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| BWP | Bandwidth Part |
| CDM | Code division multiplexing |
| CRS | Common reference signal |
| CSI-RS | Channel state information reference signal |
| DMRS | Demodulation Reference Signal |
| HARQ | Hybrid automatic repeat request |
| LTE | Long term evolution |
| NR | New radio |
| NSA | Non-standalone |
| OFDM | Orthogonal frequency division multiplexing |
| PBCH | Physical broadcast channel |
| PDCCH | Physical downlink control channel |
| PDSCH | Physical downlink shared channel |
| PRACH | Physical random access channel |
| PSS | Primary synchronization signal |
| RB | Resource block |
| SSB | Synchronization signal block |
| SSS | Secondary synchronization signal |
| TRS | Tracking reference signal |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a network node in a communication network, the method comprising:
   receiving a physical random access channel, PRACH, signal from a wireless device;
   correlating the PRACH signal with one of at least two orthogonal sequences from a common set of sequences shared among a first radio access technology, RAT, and a second RAT, the common set of sequences being partitioned based at least on a ratio of bandwidth parts, BWPs, associated with second RAT wireless devices to a total bandwidth of shared spectrum; and
   determining whether the wireless device is operating according to one of the first RAT and the second RAT based at least in part on the correlation.

2. The method of claim 1, wherein a first set of sequences of the common set of sequences are assigned to first RAT wireless devices and a second set of sequence of the common set of sequence are assigned to second RAT wireless devices, the first set of sequences being interleaved with the second set of sequences to maintain orthogonality between the first and second set of sequences.

3. The method of claim 2, wherein the first set of sequences are assigned to even subcarrier indices and the second set of sequences are assigned to odd subcarrier indices.

4. The method of claim 3, wherein the common set of sequences correspond to common sequences among at least one PRACH format for the first RAT and at least one PRACH format for the second RAT.

5. The method of claim 2, wherein a first set of sequences of the common set of sequences are assigned to a first set of first RAT beams and a second set of sequence of the common set of sequence are assigned to a second set of second RAT beams.

6. The method of claim 5, wherein the common set of sequences correspond to common sequences among at least one PRACH format for the first RAT and at least one PRACH format for the second RAT.

7. The method of claim 2, wherein the common set of sequences correspond to common sequences among at least one PRACH format for the first RAT and at least one PRACH format for the second RAT.

8. The method of claim 1, further comprising:
   determining a first region in a first RAT cell fails to overlap with second region in a second RAT cell; and
   configuring the first region in the first RAT cell and the second region in the second RAT cell to reuse sequences.

9. The method of claim 1, wherein the common set of sequences correspond to common sequences among at least one PRACH format for the first RAT and at least one PRACH format for the second RAT.

10. A network node, comprising:
    processing circuitry configured to:
    receive a physical random access channel, PRACH, signal from a wireless device;
    correlate the PRACH signal with one of at least two orthogonal sequences from a common set of sequences shared among a first radio access technology, RAT, and a second RAT, the common set of sequences being partitioned based at least on a ratio of bandwidth parts, BWPs, associated with second RAT wireless devices to a total bandwidth of shared spectrum; and determine whether the wireless device is operating according to one of the first RAT and the second RAT based at least in part on the correlation.

11. The network node of claim 10, wherein a first set of sequences of the common set of sequences are assigned to first RAT wireless devices and a second set of sequence of the common set of sequence are assigned to second RAT wireless devices, the first set of sequences being interleaved with the second set of sequences to maintain orthogonality between the first and second set of sequences.

12. The network node of claim 11, wherein the first set of sequences are assigned to even subcarrier indices and the second set of sequences are assigned to odd subcarrier indices.

13. The network node of claim 12, wherein the common set of sequences correspond to common sequences among at least one PRACH format for the first RAT and at least one PRACH format for the second RAT.

14. The network node of claim 11, wherein a first set of sequences of the common set of sequences are assigned to a first set of first RAT beams and a second set of sequence of the common set of sequence are assigned to a second set of second RAT beams.

15. The network node of claim 14, wherein the common set of sequences correspond to common sequences among at least one PRACH format for the first RAT and at least one PRACH format for the second RAT.

16. The network node of claim 11, wherein the common set of sequences correspond to common sequences among at least one PRACH format for the first RAT and at least one PRACH format for the second RAT.

17. The network node of claim 10, wherein the processing circuitry is further configured to:
determine a first region in a first RAT cell fails to overlap with second region in a second RAT cell; and
configure the first region in the first RAT cell and the second region in the second RAT cell to reuse sequences.

18. The network node of claim 10, wherein the common set of sequences correspond to common sequences among at least one PRACH format for the first RAT and at least one PRACH format for the second RAT.

19. A wireless device configured to communicate with a network node, the wireless device comprising:
processing circuitry configured to:
apply at least one of at least two orthogonal sequences from a common set of sequences shared among a first radio access technology, RAT, and a second RAT to a physical random access channel, PRACH, signal based on whether the wireless device is operating according the first radio access technology, RAT, or the second RAT to produce an encoded PRACH signal, the applying of the at least one orthogonal sequence enabling sharing of PRACH resources between the first and second RATs, the common set of sequences being partitioned based at least on a ratio of bandwidth parts, BWPs, associated with second RAT wireless devices to a total bandwidth of shared spectrum; and
transmit the encoded PRACH signal to the network node.

20. A method implemented by a wireless device that is configured to communicate with a network node, the method comprising:
applying at least one of at least two orthogonal sequences from a common set of sequences shared among a first radio access technology, RAT, and a second RAT to a physical random access channel, PRACH, signal based on whether the wireless device is operating according the first radio access technology, RAT, or the second RAT to produce an encoded PRACH signal, the applying of the at least one orthogonal sequence enabling sharing of PRACH resources between the first and second RATs, the common set of sequences being partitioned based at least on a ratio of bandwidth parts, BWPs, associated with second RAT wireless devices to a total bandwidth of shared spectrum; and
transmitting the encoded PRACH signal to the network node.

* * * * *